United States Patent [19]
Cadet

[11] 3,776,335
[45] Dec. 4, 1973

[54] INTEGRATED FREEWHEEL MECHANISMS

[75] Inventor: Raymond Cadet, Annecy (Haute Savoie), France

[73] Assignee: Societe Nouvelle de Roulements, Annecy, France

[22] Filed: Jan. 3, 1972

[21] Appl. No.: 214,652

[30] Foreign Application Priority Data
Jan. 14, 1971 France..........................7101122

[52] U.S. Cl. ............................................... 192/41
[51] Int. Cl............................................ F16d 11/06
[58] Field of Search.................... 192/41 A, 45.1

[56] References Cited
UNITED STATES PATENTS
1,596,599  8/1926  DeLavaud........................ 192/41 A
2,883,023  4/1959  Szady................................. 192/45.1
2,021,921  11/1935  Osterholm ........................ 192/41 A FOREIGN PATENTS OR APPLICATIONS
1,175,613  11/1958  France................................ 192/41 A Primary Examiner—Charles J. Myhre
Assistant Examiner—Frank Susko
Attorney—Stevens, Davis et al.

[57] ABSTRACT

An integrated freewheel mechanism characterized in that it comprises between an outer race and an inner race a plurality of rolling elements and a plurality of wedging cams having their front and back surfaces consist at least partially of parallel planes, the surfaces of said cams which engage said inner and outer races being at least partially cylindrical, said cams being each disposed between two adjacent rolling elements and urged for engagement with said inner race through resilient means.

5 Claims, 10 Drawing Figures

PATENTED DEC 4 1973　　　　　　　　　　3,776,335
SHEET 1 OF 2
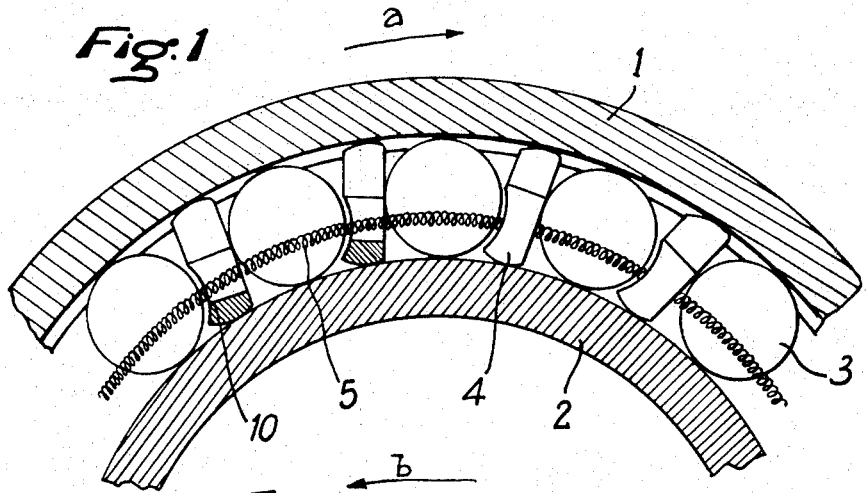
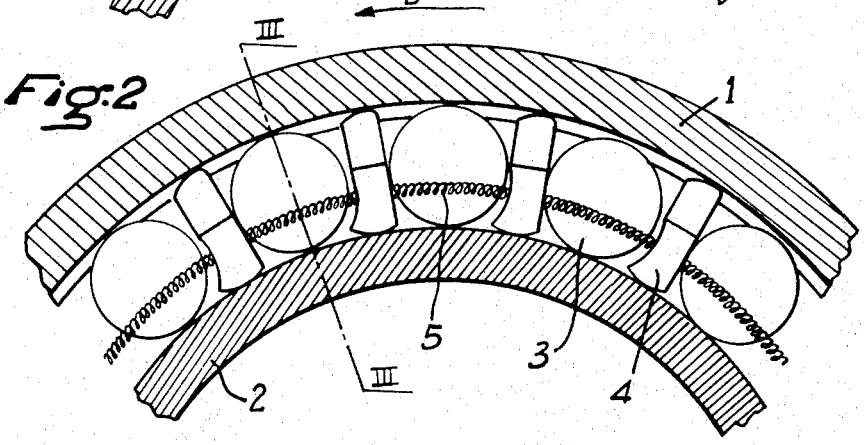
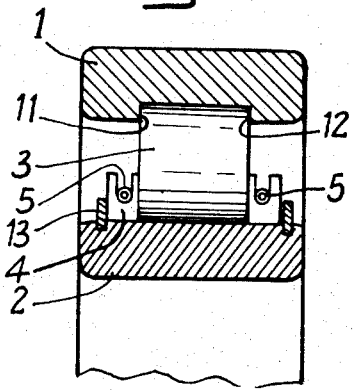
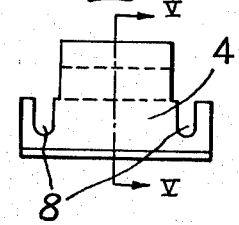
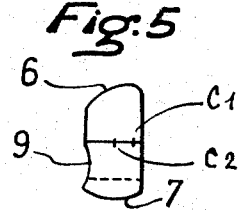
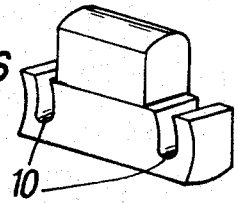

INTEGRATED FREEWHEEL MECHANISMS

The present invention relates to freewheels in general and has specific reference to a integrated freewheel mechanism, that is, a freewheel adapted to withstand either a radial load or an axial load, or a combination of these two loads, so that carrier elements such as plain bearings and the rolling-contact bearings of the shaft to be driven can be dispensed with.

Now various types of integrated freewheel mechanisms have already been proposed.

One of them comprises an assembly of two carrier members with a mechanically juxtaposed counter-release member. This practical actuation of a rather heterogeneous mounting is attended by several inconveniences. In fact, in addition to its delicate construction, this device is rather cumbersome and its drag is considerable.

Another known construction comprises between an outer race and an inner race a plurality of rolling elements, wedging cams and distance-pieces. The rolling elements and wedging cams are retained in cages and the distance-pieces are secured to a lateral ring interposed in the fashion of a comb between the rolling elements and the cams. However, also in this type of freewheel the drag is relatively important and the mounting is generally rather delicate.

It is the essential object of the present invention to avoid the inconveniences set forth hereinabove by providing an integrated freewheel mechanism constructed from a standard rolling-contact bearing of any type, of which the rated load is not overstepped.

The integrated freewheel according to this invention comprises between an inner race and an outer race a plurality of wedging members each disposed between two rolling-contact elements and urged by resilient means against said inner race.

The wedging members comprise a front surface and a back surface consisting of more or less parallel planes. They are also provided with a surface adapted to engage the outer race and a surface adapted to engage the inner race. Each one of these two surfaces is at least partially cylindrical. The back surface advantageously comprises a concave portion adapted to match or accomodate the curvature of the adjacent rolling-contact element.

According to a preferred form of embodiment of this invention the cam surface adapted to engage the inner race is on the one hand one portion of a cylinder having its axis contained in the median longitudinal plane of the cam and the cam surface adapted to engage the outer race is a cylindrical portion of which the axis lies outside the median plane of the cam, ahead of the cam, and on the other hand a convex surface connecting said cylindrical portion to said front surface.

With this particular configuration the cams can perform the desired rocking movements and produce the desired wedging action between the races, but it is clear that other configurations akin to the one broadly set forth hereinabove could be used to advantage without departing from the spirit and scope of the invention while providing an equivalent result.

Other features and advantages of this invention will appear as the following description proceeds with reference to the accompanying drawing, in which :

FIG. 1 is a fragmentary, part-sectional view of a rolling-contact bearing in its "free" position, the section being taken in a plane perpendicular to the axis of rotation, the diretion of rotation being shown by the arrow $a$ ;

FIG. 2 is a view similar to FIG. 1 but showing the rolling-conatct bearing in its locked position, the direction of rotation being in this case the one shown by the arrow $b$ ;

FIG. 3 is a cross section taken along the line III—III of FIG. 2 ;

FIG. 4 is a front view of a wedging cam ;

FIG. 5 is a detail view showing a cam as seen in the direction of the arrow V—V of FIG. 4 ;

FIG. 6 is a perspective view of a cam ;

Figure 7:
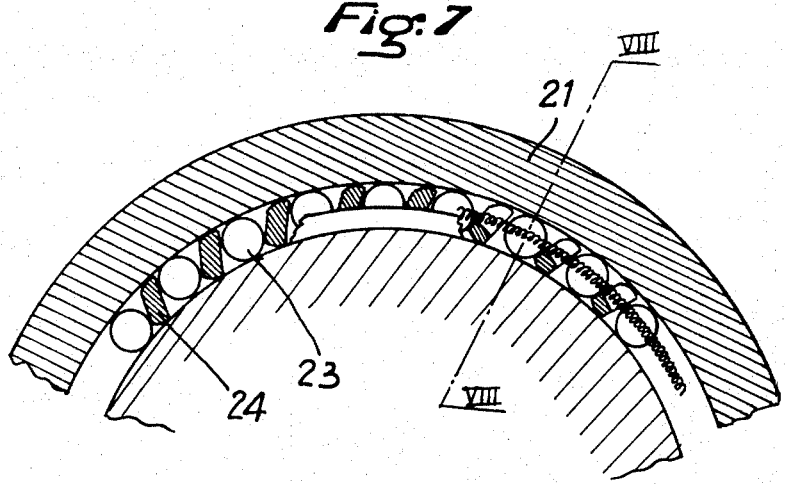
FIG. 7 is a part-sectional view showing a rolling contact bearing without any inner race.

Referring to the first form of embodiment of the invention as illustrated in FIGS. 1 to 6 inclusive of the drawing, the integrated freewheel mechanism with cylindrical rollers which constitute the subject-matter of this invention comprises an outer race 1, an inner race 2, carrier rollers 3 and wedging cams 4.

The cams 4 are mounted between the rollers 3 of the rolling-contact bearing without modifying the normal pitch of these rollers, since their thickness is particularly moderate. The hardness is such that they cannot damage the races during the wedging periods. These cams are adapted to oscillate normally without producing any wedging effect between the rollers, due to the provision of the concavity 9. The cams are formed with two opposite cylindrical surfaces 6, 7 bearing against the inner and outer races, respectively, of the freewheel. The centres $C_1$ and $C_2$ of these two cylindrical bearing surfaces 6 and 7 are off-set in such a manner that according to the position assumed by these cams 3 a wedging effect can be obtained between the inner and outer races of the freewheel mechanism.

As clearly shown in FIGS. 4 and 6, the cams 4 are formed with lateral grooves 8 engaged by a pair of circular helical springs 5 constantly urging the cams against the inner race 2. The cam grooves 8 are so designed that the springs exert their pressure against the end 10 of said grooves so as to rock these cams until the surface 6 bears on the surface of the race 1. Thus, in case of reversal in the direction of relative rotation of races 1 and 2, the torque is transmitted immmediately, since the cams 4 engage the surfaces of the inner and outer races.

The thickness of the cams is such that they can be fitted in a cage of conventional type, the number of rollers remaining the same as in conventional rolling-contact bearings so that the rollers are not overloaded. On the other hand, the drag in this bearing is increased since a frictional contact is produced between the cams and the inner and outer races.

In the example illustrated in FIG. 3 the rollers 3 are retained in the axial direction by shoulders 11 and 12 formed on the outer race 1. The cams are retained in the axial direction by a pair of circlips 13 or any other suitable means such as beinding rings or insert rings.

Figure 8:
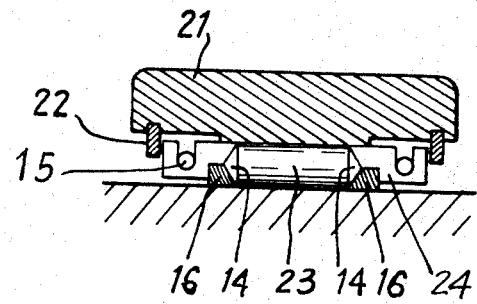
FIG. 8 is a radial section taken along the line VIII—VIII of FIG. 7, to show specific details of the structure shown therein.
Figure 9:
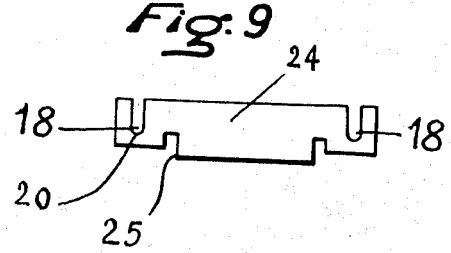
FIG. 9 is a front view of a cam incorporated in the device of FIGS. 7 and 8.
Figure 10:
FIG. 10 is a side view of the cam shown in FIG. 9.

In FIGS. 7 to 10 of the drawings there is shown a similar type of freewheel but formed in a needle bearing with the specific feature that the assembly has no inner race, in contrast to the preceding example, the needles engaging directly the shaft on which the freewheel is fitted. The complete assembly is therefore of considerably reduced over-all dimensions.

The general and basic principle is the same as in the preceding example, except that the needles 23 and cams 24 are retained by a pair of trapezoidal rings 14 retained in turn in the axial direction by a pair of notches 25 formed in the cams 24. Helical springs 15 are fitted in grooves 18 and bear against the bottom of each groove 18.

The needles 23, due to the presence of abutment elements 16 engaging the tapered portion of rings 14 are held in position. The needle and cam assembly is retained on the outer race 21 by a pair of circlips 22 or any other suitable means.

This description clearly illustrates the advantages deriving from the use of the freewheel mechanisms according to this invention. The following advantages may also be mentioned as characterizing this invention:

Standard elements of conventional rolling-conatct bearings are used; this applies to the inner and outer races, and also to the rollers. The rated load of these rollers is maintained. The torque transmitted in the wedging position is relatively high due to the considerably number of cams. The manufacturing procedure and assembling of this device are particularly simple due notably to the fact that the cams are cut from section stock of relatively great length. Finally, the drag is inferior to that of conventional or similar mechanisms of this character.

I claim:

1. An integrated freewheel mechanism characterized in that it comprises between an outer race and an inner race a plurality of rolling elements and a plurality of wedging cams having their front and back surfaces consist at least partially of parallel planes, the surfaces of said cams which engage said inner and outer races being at least partially cylindrical, said cams being each disposed between two adjacent rolling elements and urged for engagement with said inner race through resilient means, said cams having on their back surface a concavity matching the curvature of the rolling element registering therewith.

2. An integrated freewheel mechanism as set forth in claim 1, wherein the cams comprise a surface adapted to engage one of the two races which has its axis contained in the longitudinal median plane of said cam and the other surface adapted to engage the other race provided on the one hand with one fraction of a cylindrical surface having its axis disposed outside said median plane ahead of said can, and on the other hand a convex surface connecting said cylindrical fraction to said front surface.

3. An integrated freewheel mechanism as set forth in claim 1, characterized in that said wedging cams are retained in the axial direction by a pair of circlips rigid with the inner race.

4. An integrated freewheel mechanism as set forth in claim 1, wherein said rolling elements consist of needles each retained in the axial direction on said inner race by a pair or retaining rings engaging lateral notches formed in said wedging cams so as to hold said rings against axial movement.

5. An integrated freewheel mechanism as set forth in claim 4, wherein the needle-and-cam assembly is retained on said outer race by a pair of circlps.

* * * * *